(12) United States Patent
Tieman et al.

(10) Patent No.: US 8,232,897 B2
(45) Date of Patent: Jul. 31, 2012

(54) VEHICLE LOCATOR KEY FOB WITH RANGE AND BEARING MEASUREMENT

(75) Inventors: Craig A. Tieman, Westfield, IN (US); Lev M. Vitkin, Carmel, IN (US); Fiean Liem, El Paso, TX (US); Curtis Paul Houllion, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 1141 days.

(21) Appl. No.: 12/148,079

(22) Filed: Apr. 16, 2008

(65) Prior Publication Data

US 2009/0264082 A1    Oct. 22, 2009

(51) Int. Cl.
*G06Q 30/00* (2012.01)
(52) U.S. Cl. ............ 340/990; 705/26; 705/27; 701/300
(58) Field of Classification Search ............... 701/2, 300; 340/990
See application file for complete search history.

(56) References Cited

U.S. PATENT DOCUMENTS

| | | | |
|---|---|---|---|
| 5,899,958 A * | 5/1999 | Dowell et al. | 702/6 |
| 6,788,199 B2 * | 9/2004 | Crabtree et al. | 340/539.13 |
| 2009/0091477 A1 * | 4/2009 | Mc Call et al. | 340/990 |

OTHER PUBLICATIONS

Wireless location in non-line-of-sight environments, by Venkatraman, Saipradeep, Ph.D., University of Cincinnati, 2004, 175 pages; AAT 3146528, downloaded from ProQuestDirect on the Internet on Apr. 4, 2012, 2 pages.*

* cited by examiner

*Primary Examiner* — James Zurita
(74) *Attorney, Agent, or Firm* — J. Gordon Lewis

(57) ABSTRACT

An apparatus and method of determining bearing and distance measurements between a mobile device and an object using Rf based measurements. The mobile device communicates with a control in the object to determine the relative bearing between the mobile device and the object with respect to magnetic north and, optionally, the distance between the mobile device and the object. An indicator on the mobile device aid in directing s the user of the mobile device toward the object as the mobile device is moved relative to the object. The mobile device can be a key fob and the object can be a vehicle.

11 Claims, 5 Drawing Sheets

US 8,232,897 B2

VEHICLE LOCATOR KEY FOB WITH RANGE AND BEARING MEASUREMENT

BACKGROUND

The present invention relates, in general, to object locator apparatus and methods and, also, to wireless vehicle key fobs for remotely activating vehicle control functions.

The difficulty of finding a vehicle in a large parking lot, at shopping centers, sporting or music events, multi-level parking structures, etc., is a common problem experienced by all drivers on a regular basis. Long range key fobs have historically been used to activate a vehicle horn and exterior lights which can alert a driver to the vehicle location via audible and/or visual cues. This approach works well if the driver is within hearing or visual range of the vehicle and there are no obstructions or structures which would interfere with hearing or seeing the vehicle. This method does, however, create a nuisance in the form of noise pollution and possible embarrassment to the driver since many people could also hear the horn.

It has been proposed to incorporate a GPS receiver and a high accuracy compass into a key fob to facilitate determining the location of a parked vehicle with respect to the key fob location. This approach, however, has a significant cost and size/weight increase to the key fob for the GPS and compass components.

SUMMARY

A mobile object locator key fob with range and bearing measurements is disclosed.

In one aspect, a method for determining the location of an object by a remote, mobile apparatus comprises the steps of generating a bearing signal from the object with respect to magnetic north, receiving the bearing signal by the mobile apparatus, determining by the mobile device the relative bearing between the mobile device and the object, and providing direction information, including the relative bearing to the user of the mobile apparatus to aid in directing the user to the object.

The method can also include the step of updating the direction information provided to the user of the mobile apparatus as the mobile apparatus is moved relative to the object.

The method may also include the step of determining distance between the mobile device and the object, and the step of providing direction information to the user may include providing a relative distance between the mobile apparatus and the object.

An object remote location apparatus includes a control coupled to a transmitter and a receiver and adapted to be mounted on an object to transmit and receive wireless signals with respect to a remote mobile device, a mobile device having a transmitter and a receiver and one input member carried on the mobile device for activating an object location determining sequence between the mobile device and the control to aid the user of the mobile device to locate the object.

An antenna, responsive to the control generates an angularly rotating signal containing a signal angle information relative to magnetic north. The mobile device is operative to detect the angularly rotating signal and to decode the signal angle information in the rotating signal to determine a relative bearing to magnetic north between the mobile device and the object.

The mobile device includes an indicator carried on the mobile device for providing direction information including at least the relative bearing to the user of the mobile device to provide the location of the object relative to the mobile device.

BRIEF DESCRIPTION OF THE DRAWING

The various features, advantages, and other uses of the present invention will become more apparent by referring to the following detailed description and drawing in which.

DETAILED DESCRIPTION

Figure 1:
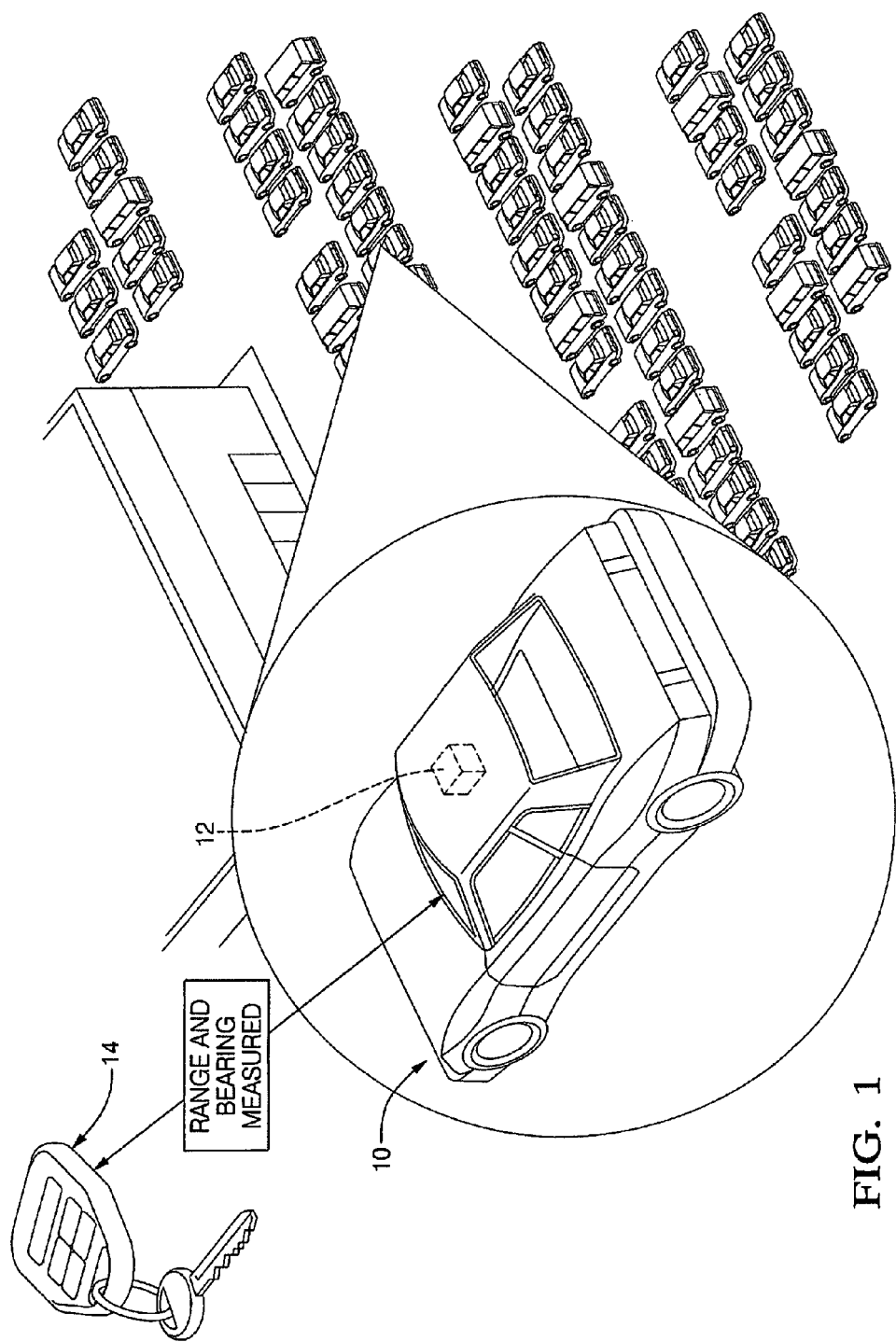
FIG. 1 is a pictorial representation of a vehicle key fob for locating the vehicle using range and bearing measurement.

Referring now to the drawing, and to FIGS. 1-4 in particular, there is depicted a vehicle 10 having a remote keyless entry or RKE apparatus 12 mounted therein. A wireless key fob and transmitter 14 is associated with the RKE 12 and is identifiable by a unique frequency match to enable only the fob 14 to transmit signals to the RKE 12 which are recognized by the RKE 12 as being valid for vehicle control functions.

Figure 2:
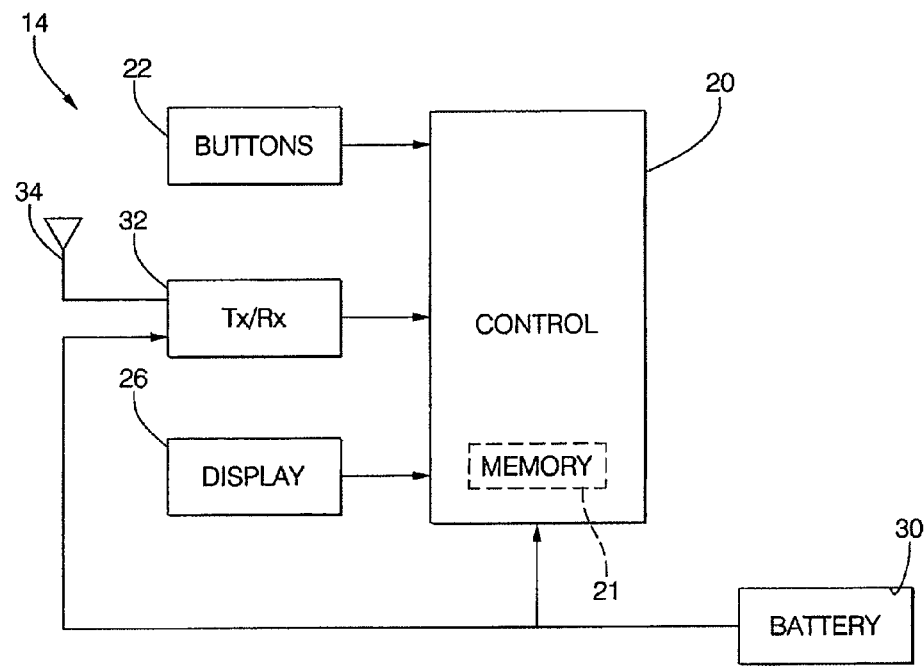
FIG. 2 is a schematic diagram of the components of the key fob shown in FIG. 1.
Figure 3:
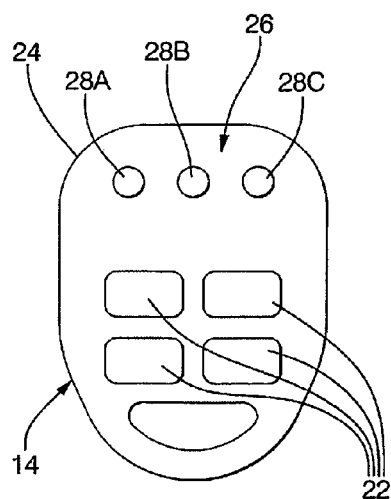
FIGS. 3A and 3B are plan views of the key fob having alternate indicators or displays.
Figure 3:
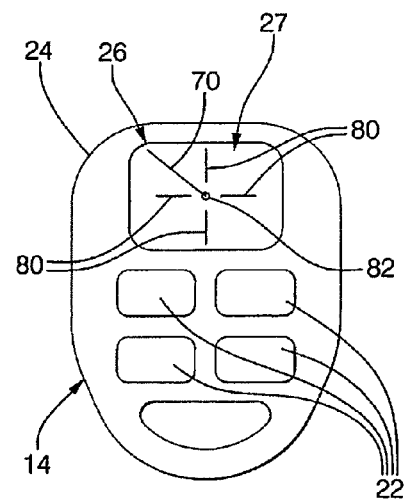

As shown in detail in FIG. 2, the fob 14 includes a control 20, which may be a processor based control executing a control program stored in a memory 21. One or more input members or buttons 22 are mounted on the housing 24 of the fob 14. The input members or buttons 22 are associated with a particular vehicle function, such as locking or unlocking the vehicle doors and/or trunk or hatch, lowering the vehicle windows, remotely starting the vehicle engine, flashing the vehicle horns and/or lights, etc. An indicator 26, such as an LED display 27 shown in FIG. 3B, or one of more illuminatable devices, such as LEDs 28A, 28B and 28C shown in FIG. 3A, may also be mounted in the fob housing 24 to display vehicle status or button 22 selection information.

It will be understood that the shape of the fob housing 24, the number and functions designated by the buttons 22, and the type and shape of the optional display 26 can have any configuration.

A power supply 30 is contained in the housing 24 for powering the components of the fob 14 as shown in FIG. 2. A transmitter or a transmitter/receiver, transceiver or transponder 32 is mounted in the housing 24 for transmitting a data signal generated by the control 20 in response to depression or activation of one of the buttons 22 through an antenna 34. The transmitter 32 has a frequency of operation between 300 MHz to 915 MHz, for example only.

The user depresses or activates one of the buttons 22 associated with the desired vehicle function that the user wishes to initiate. The input signal from the button 22 wakes up or activates the processor in the control 20 which outputs a data stream to the transmitter 32. The data stream may include a data preamble, the actual vehicle function command, i.e., unlock vehicle doors, etc., an optional rolling code for vehicle to vehicle security, and possibly one or more check bits. This signal is sent by the transmitter 32 through the antenna 34 to the RKE 12 where it is received by a receiver 40 through an antenna 42. The signal is demodulated by a vehicle access controller 44 which can also be a microprocessor based controller 44. The controller 44 outputs a signal to a vehicle function control device or to a vehicle body computer which implements the desired vehicle function.

It will be understood that the description of the fob 14 and vehicle RKE 12 for remotely controlling various vehicle functions, such as locking and unlocking doors, activating vehicle horn and/or lights, etc., is by way of example only as the following description of a method and apparatus for determining range and bearing measurement between the vehicle and the key fob can be implemented without remote vehicle control functions provided by the fob and by the vehicle RKE.

In one aspect, the control 20 of the fob 14 and the RKE 12 in the vehicle or stationary object are programmed with appropriate transmit and receive capabilities to perform both relative bearing or angle and range or distance measurement using radio frequency signals. The relative bearing or angle and the range or distance measurement use processing techniques similar to Automatic Direction Finder (ADF) or VHF Omni-Range (VOR) using a radio frequency transmitter on a stationary object to be located, such as the vehicle 10, which broadcasts a unique signal which the mobile or remote device, such as the fob 14 in the present implementation, receives and analyzes to determine the relative or absolute angle between the mobile device and the stationary transmitter.

Figure 4:
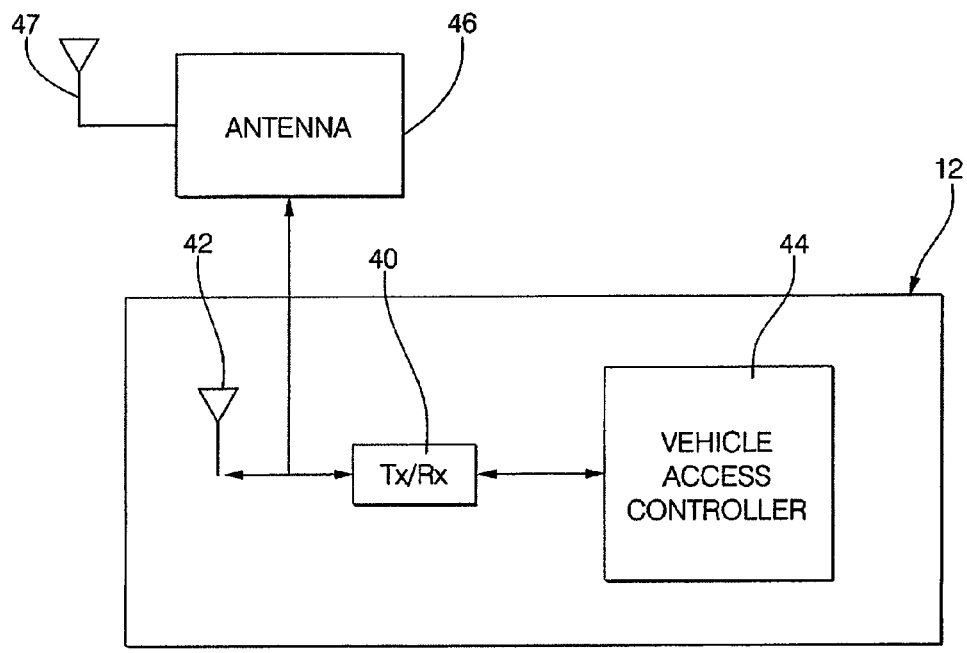
FIG. 4 is a schematic diagram of the components of the remote keyless entry control and antenna.

For example, as shown in FIG. 4, an antenna 46/47 which generates a circumferential, rotating signal carrying absolute or relative angle of the antenna 46 relative to local magnetic north. The antenna 46 may be a phase array antenna continuously generating rotating or circumferentially oriented signals, such as signals A, B, and C in FIG. 5, which carry relative angle or hearing information of each signal A, B, or C, relative to magnetic north 48 as detected by compass or other equipment used to measure the earth's magnetic field at the location of the antenna 46. The signals A, B, and C, respectively carry different angle information as each signal is generated by the antenna 46.

Figure 5:
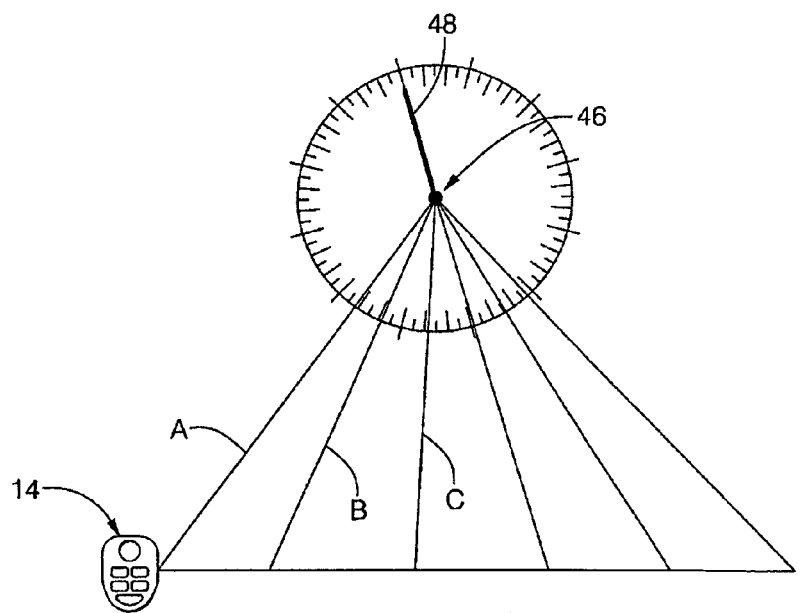
FIG. 5 is a pictorial representation of the bearing determination of the key fob and remote keyless entry control.

As shown in FIG. 5, depending on the position of the fob 14 relative to the antenna 46 which is mounted on the vehicle 10, the fob 14 will detect and receive one of the angular rotating signals A, B. and C generated by the antenna 46. The control 20 of the fob 14 decodes the angular signals A, B, and C, and determines an angle or bearing between the fob 14 and the vehicle 10 on which the antenna 46 is mounted.

The control 20 in the fob 14 also can determine approximate distance between the mobile device of fob 14 and the vehicle 10 by signal propagation time delay of an Rf signal between the mobile device 14 and the vehicle 10 or by other means, such as the relative signal strength of a return signal from the RKE 12 in response to a distance request signal from the fob 14.

Figure 6:
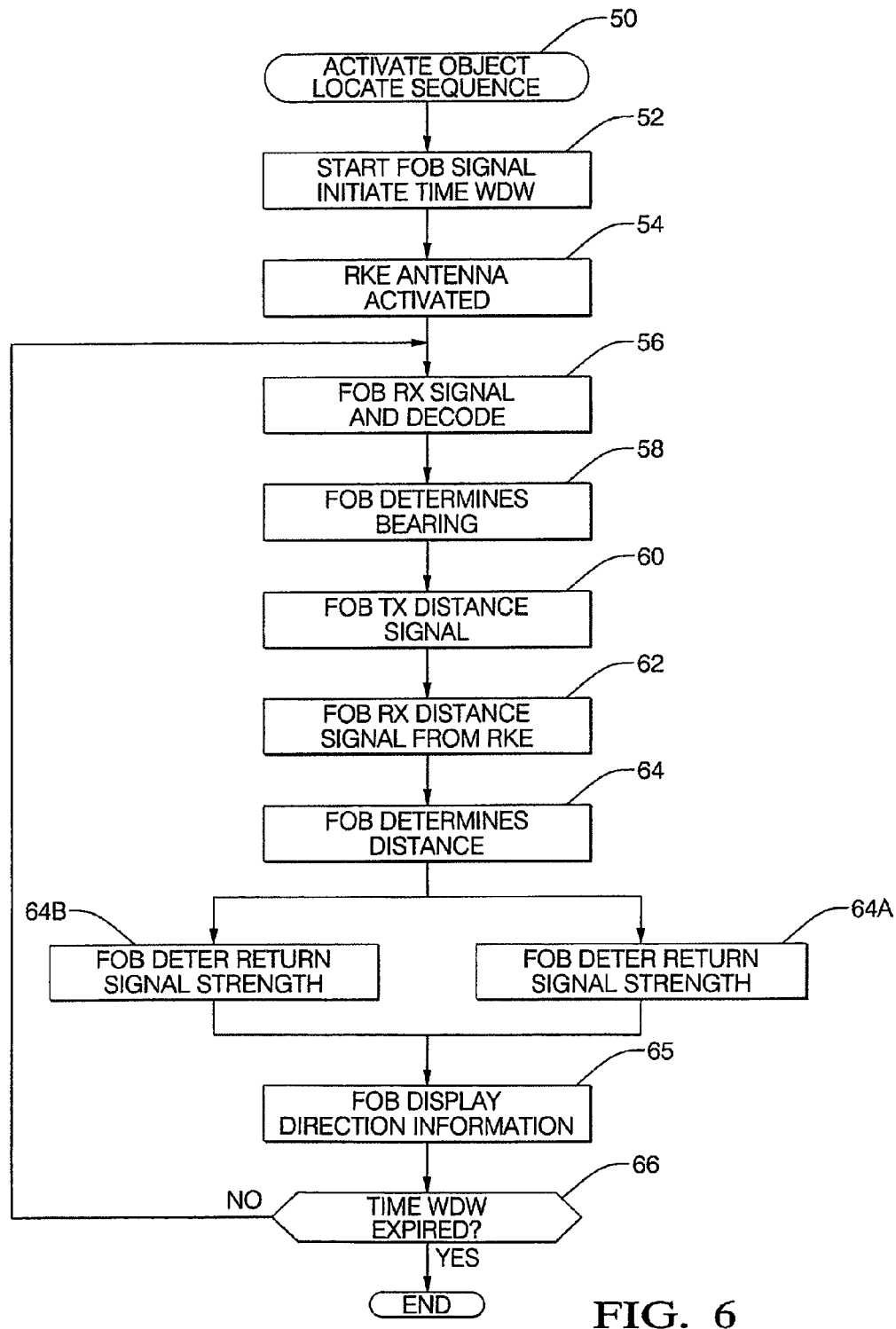
FIG. 6 is a flow chart showing the major steps in the range and bearing measurement method.

As shown in FIG. 6, for power conservation purposes, the vehicle or object locator sequence would only be enabled when the vehicle owner initiates it via depression of one of the input members 22 on the fob 14 as shown by step 50 in FIG. 6. The object locate sequence would be active only for a set time as established by a time window in step 52. The fob 14 sends an initiation signal in step 52 to the vehicle RKE 12 which activates the antenna 46 of the vehicle RKE 12 in step 54. In this step, the antenna 46 generates the circumferentially spaced continuously rotating angle containing signals A, B, and C, etc., as shown in FIG. 5. One of these signals A, B, C, etc., is received and decoded by the fob 14 in step 56. The control 46 in the fob 14 uses this angular information to determine the relative angle or bearing between the fob 14 and the vehicle 12 with respect to magnetic north in step 58.

Simultaneous with the activation signal in step 52 or as an independent time space signal, the fob 14 transmits a distance measurement signal in step 60 to the RKE 12. Immediately upon receiving the distance measurement signal, the vehicle access controller 44 in the RKE 12 retransmits a return signal via the transmitter 40 and antenna 46 which is received by the fob 14 in step 62. The time propagation delay between the start of transmission of the distant signal by the fob 14 in step 60 until the return signal is received by the fob 14 in step 62 is used by the control 20 in the fob 14 to determine the approximate distance between the fob 14 and the vehicle 10 in step 64, taking into account the propagation delay of an Rf signal in air and the short signal processing time required by the RKE 12 upon receiving the distant signal from the fob 14 before the RKE 12 retransmits a return signal to the fob 14 in step 64A.

Alternately, the fob control 20 measures the return signal strength in step 64B and compares it to pre-established distance versus signal strength relationships to determine the approximate distance between the fob 14 and the vehicle 10.

The fob 14 can provide the bearing and/or range information to the user of the fob 14 in different ways in step 65. In one aspect shown in FIG. 3A, one or more illuminatable devices, such as LEDs 28A, 28B, and 28C are mounted on the housing 24 of the fob 14. Each LED 28A, 28B, 28C may be a different color or the centrally located LED 28B in the illustrated example of three LEDs, 28A, 28B, or 28C can be one color to indicate that the user is following a direct path to the vehicle, and the other LEDs 28A and 28C located to the left and right of the central LED 28B can be used to indicate that the user is diverging from the direct bearing or path to the vehicle 10. This use of the LEDs 28A, 28B, and 28C, which also can include flashing signals from one or more of the LEDs 28A, 28B, and 28C, with the flash cycle indicative of the approximate distance, whether increasing or decreasing, between the fob 14 and the vehicle 10 to guide the user via a "cold, warm, hot" dead reckoning-type locator system.

Figure 7:
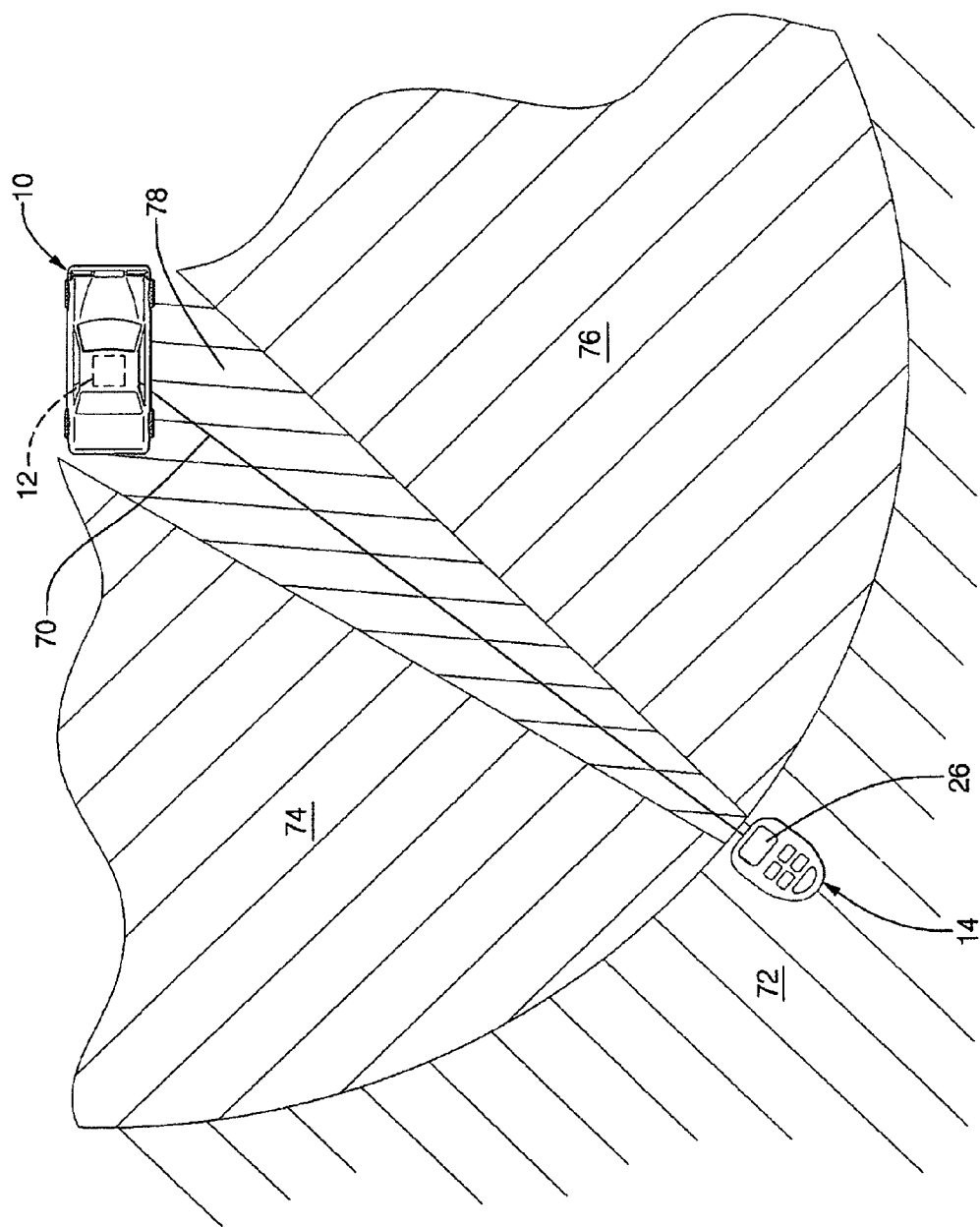
FIG. 7 is a pictorial representation of the use of the key fob with range and bearing measurement to assist a vehicle driver in locating the vehicle.

Referring briefly to FIG. 7, the fob 14, after determining the bearing and distance between the fob 14 and the vehicle 10, determines a direct path shown pictorially by reference number 70 to the vehicle 10. As long as the user of the fob 14 follows this path 70, only the LED 28B would be lit. As the LED 28B could flash at a periodic rate which decreases in time as the distance between the fob 14 and the vehicle 10 decreases. The flash rate of the LED 28B could also decrease if the user of the fob 14 were to move away from the direct path to the vehicle 10 into the area denoted by reference number 72 in FIG. 7.

The LEDs 28A and 28C would be illuminated by the control 20 of the fob 14 when the user diverges from the path 70, while still decreasing the distance between the fob 14 and the vehicle 10, by moving into the areas 74 and 76 to the left and right, respectively, of the direct path 70.

It will be understood that the direct path 70 could also cover a slight diversion sector area 78 which is still close enough to the direct path 70 to be useful in leading the user of the fob 14 to the relative area of the vehicle 10.

In another aspect shown in FIG. 3B, a visual graphical display 27 on the fob 14 can include display 27, such as an LCD display, for example, which is capable of displaying graphic representations, such as the main compass points, north, south, east, and west, all denoted by reference number 80, and a line depicting the direct path 70 from the location of the fob 14 denoted at a center point 82 on the display 27 to the vehicle 10. The relative angle of the direct path 70 to one of the main compass directions 80 would be changed by the control 20 in the fob 14 if the user were to turn in a circle or otherwise diverge from the direct path 70 to the vehicle.

The display 27 can also include a flashing signal whose flash rate is proportional to the changing distance between the fob 14 and the vehicle 10.

The fob control 20 will continue to update the bearing and/or range information as the user moves relative to the vehicle 10 as long as the total time of the locate sequence is within the total time established by the locate sequence time window in step 52. The total time is checked in step 66 and the locate sequence terminated if the total preset time has been exceeded, or continued as explained above if time remains in the time window.

The use of Rf based bearing and distance measurement techniques in a fob 14 and the vehicle RKE controller 12 results in a low cost, light and small fob whose functional range is limited only by the effective Rf range of the system. The use of Rf signals for bearing an arranged measurement enables the fob 14 to be used in locating the vehicle 10 in ranges up to one mile or more in open air as well as at shorter distances in covered structures, such as parking garages.

In addition, the range and measurement features described above may be incorporated into existing configurations for vehicle fobs 14 and vehicle RKE controls 12 without requiring additional space, complex components, or external ground or satellite infrastructure.

What is claimed is:

1. An object location apparatus comprising:
a control adapted to be mounted on an object to transmit and receive circumferential, rotating wireless signals with respect to a remote mobile device;
a transmitter and a receiver coupled to the control;
the mobile device having a transmitter and a receiver; and
one input member carried on the mobile device for activating a location determining sequence in the mobile device and the control to aid the user of the mobile device in locating the object.

2. The apparatus of claim 1 further comprising:
an antenna, responsive to the control, for generating said angularly rotating signal containing signal angle information relative to magnetic north; and
the mobile device operative to detect the angularly rotating signal and to decode the signal angle information in the angularly rotating signal to determine a bearing relative to magnetic north between the mobile device and the object.

3. The apparatus of claim 1 further comprising:
the mobile device operative to determine an approximate distance between the mobile device and the object.

4. The apparatus of claim 3 wherein:
the mobile device determines the distance by determining the time delay of a signal transmission from the mobile device to the object and a return signal from the object to the mobile device.

5. The apparatus of claim 3 wherein:
the mobile device determines the distance of determining the signal strength of a return signal from the object to the mobile device.

6. The apparatus of claim 1 further comprising:
an indicator carried on the mobile device for providing direction information including at least the relative bearing to the user of the mobile device to provide the location of the object relative to the mobile device.

7. The apparatus of claim 6 further comprising:
the mobile device operative to update the direction information as the mobile device is moved relative to the object.

8. The apparatus of claim 6 wherein the indicator comprises:
a visual display carried on the mobile device and providing geographic location information including a bearing path between the mobile device and the object.

9. The apparatus of claim 6 wherein the indicator comprises:
at least one illuminatable element carried on the mobile device for indicating when the user of the mobile device is moving on a substantially direct path to the object as the mobile device is moved relative to the object.

10. The apparatus of claim 9 wherein the at least one illuminatable element comprises:
a plurality of light emitting diodes carried on the mobile device for indicating relative separation of the user of the mobile device from a direct path between the mobile device and the object as the mobile device is moved relative to the object.

11. The apparatus of claim 1 wherein:
the object is a vehicle; and
the mobile device is a portable key fob.

* * * * *